(No Model.)
C. CALLAHAN.
NOZZLE.
No. 311,720. Patented Feb. 3, 1885.
Fig: 6.
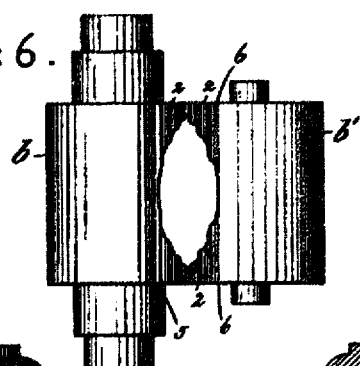
Fig: 1. Fig: 2.
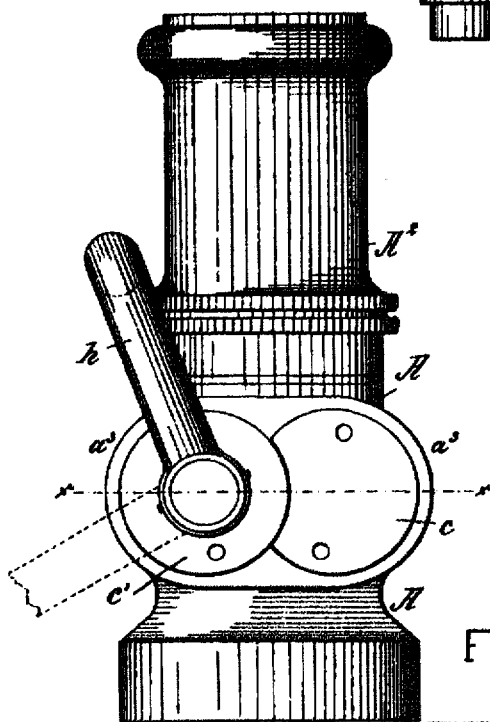
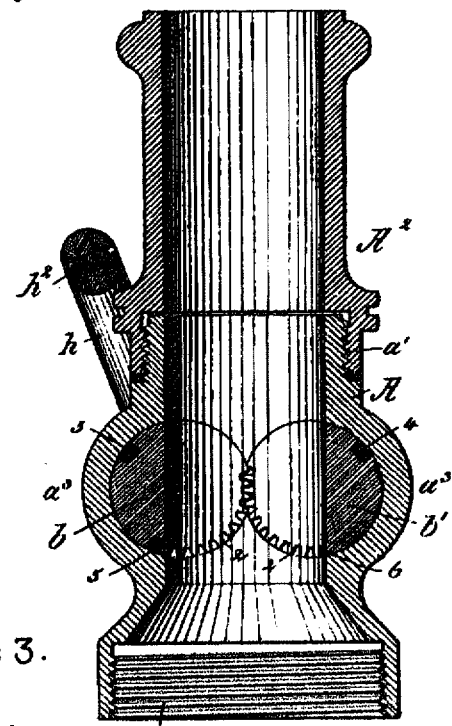
Fig: 4. Fig: 3. Fig: 5.
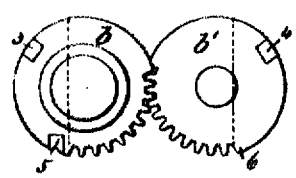
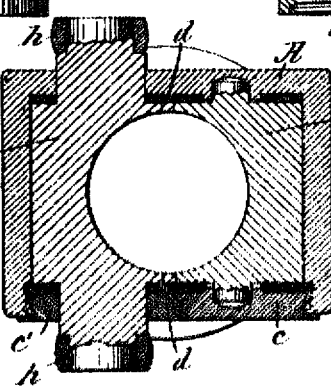
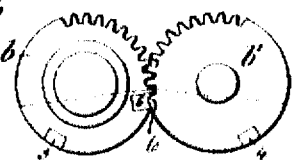
Witnesses. Inventor.

UNITED STATES PATENT OFFICE.

CORNELIUS CALLAHAN, OF CHELSEA, MASSACHUSETTS.

NOZZLE.

SPECIFICATION forming part of Letters Patent No. 311,720, dated February 3, 1885.

Application filed July 5, 1884. (No model.)

*To all whom it may concern:*

Be it known that I, CORNELIUS CALLAHAN, of Chelsea, county of Suffolk, State of Massachusetts, have invented an Improvement in Discharge-Pipes for Hose, of which the following description, in connection with the accompanying drawings, is a specification, like letters on the drawings representing like parts.

My invention has for its object the production of a discharge-pipe in which the stream shall be cut off by a movement of the surfaces of two valves toward the center of the water-way of the pipe, the water being permitted to pass through the discharge-pipe after a reverse movement of the valve, the water-passage through the valve of the pipe when fully open being of the same diameter as the inner diameter of the pipe.

My invention consists, essentially, in a discharge-pipe provided with a valve composed of two cylinders, each cut away centrally or between their ends, as will be described. The said cylinders have journals at each end which take bearing in the walls of the pipe, and the cylinders are geared together to rotate in unison.

Figure 1, in side elevation, shows a discharge-pipe embodying my invention; Fig. 2, a longitudinal section thereof with the valve open; Fig. 3, a cross-section of Fig. 1 in the dotted line $xx$. Fig. 4 shows the ends of the valves with the water-way open. Fig. 5 is a like view with the valves turned to close the water-way, and Fig. 6 is a top view of the valves partially closed.

The discharge-pipe A, threaded at $a$ to fit a hose-connection, and at $a'$ to receive a nozzle-piece, $A^2$, is made with one open side, (see Fig. 3, where the pipe is shown in section,) and is bulged at $a^3$ to receive the partial cylinders $b$ $b'$, which constitutes a valve, the wall of the said pipe opposite its open side being provided with a seat for one of the journals of the cylinder $b'$, and with a hole for the passage of the journal of the cylinder $b$, all as shown in Fig. 3. The opposite journals of the cylinders $b$ $b'$ are supported in bearing-disks $c$ $c'$, screw-threaded at their peripheries to engage threads of the pipe, and also threads each of the other. The disk $c$, first screwed into place, has a segmental recess (see Fig. 1) cut into one edge of it, so that the disk $c'$ may be thereafter screwed into position about the journal of the cylinder $b$, and serve to lock the disk $c$ in place. Packing $d$ $d$, of leather or other suitable material, is interposed between the cylinder and the pipe and the disks $c$ $c'$.

Each cylinder, at or near the center of its length and at one side of its periphery, has cut from it at right angles to its axis a semi-circular piece of metal, leaving a groove or recess equal to the size of the metal so removed, and, as shown in Figs. 2 and 3, the portions of the cylinders so removed form a space which, when the grooves in each cylinder are brought opposite to each other, equals in area the area of the central opening of the pipe.

The cylinders $b$ $b'$ are provided about their peripheries with teeth 2 2, which are so located with relation to the portions of the cylinders which are removed to form the water-way that the cylinder $b$, as it is rotated by the hand-lever $h$ secured to it, also moves the cylinder $b'$ in unison with it.

Referring to Fig. 2, where the valve is open, it will be seen that the cylinders are provided with packing at 3 and 4, which acts to pack the space between the cylinders and the inner wall of the pipe, and cylinder $b$ is provided with a packing-strip, 5, which, when the valve is closed, as in Fig. 5, is met by a tooth or projection, 6, which extends from end to end of the cylinder $b'$, the said packing 5 and tooth 6 serving as the packing for the meeting portions of the closed valve.

The handle $h$ is made in two halves, each having an eye to embrace a journal of the cylinder $b$, the opposite ends of the handle-pieces, one being slotted and the other provided with a tongue, being united by a screw, $h^2$. Movement of the handle into dotted-line position, Fig. 1, closes the valve, the cylinders turning into the position shown in Fig. 5.

The rotation of the cylinders from their position Fig. 5, for the passage of water through the pipe, gradually opens the water-way, the said opening commencing at the center line of the pipe and gradually opening to the full size of the bore of the pipe, as will be apparent from inspection of Figs. 1 and 6, and the water in its outward passage meets like surfaces which act alike and tend to maintain a central direct current through the pipe.

I claim—

1. A discharge-pipe threaded at one end to receive the hose-connection, and at its other end to receive the nozzle, and bulged at $a^3$ for the reception of about one-half of each of two partial cylinders, combined with a valve composed of two partial cylinders, each having a portion of its periphery removed to its longitudinal center, and provided with teeth to insure their movement in unison, rotation of the partial cylinders opening and closing the water-way, all substantially as described.

2. The discharge-pipe and a valve composed of two partial cylinders having a portion of their peripheries removed to constitute a water-way, combined with the two disks $c\ c'$, to receive each one of the journals of the said cylinders, the pipe having bearings for the remaining journals, substantially as described.

3. The discharge-pipe A, threaded at one end to receive the hose-connection, and at its other end to receive the nozzle, and bulged at $a^3$ for the reception of about one-half of each of two partial cylinders, combined with a valve composed of two partial cylinders, each having a portion of its periphery removed to its longitudinal center, and provided with teeth to insure their movement in unison, and with packing 3 4, interposed between the said cylinders and pipe, to operate all substantially as described.

4. The discharge-pipe A and the valve composed of two partial cylinders, each having a portion of its periphery cut away, and the partial cylinders being each provided with teeth to insure the movement in unison, combined with a tooth, 6, on one cylinder and a co-operating packing, 5, on the other cylinder, to operate substantially as described.

In testimony whereof I have signed my name to this specification in the presence of two subscribing witnesses.

CORNELIUS CALLAHAN.

Witnesses:
G. W. GREGORY,
B. J. NOYES.